No. 834,555. PATENTED OCT. 30, 1906.
L. L. BARTLETT.
REEL SEAT.
APPLICATION FILED MAR. 12, 1906.

WITNESSES:
F. W. Wright
Beatrice Mirris

INVENTOR
Leander L. Bartlett
BY
Emmons R. Newell
ATTORNEY

THE NORRIS PETERS CO., WASHINGTON, D. C.

UNITED STATES PATENT OFFICE.

LEANDER L. BARTLETT, OF MONTAGUE CITY, MASSACHUSETTS.

REEL-SEAT.

No. 834,555.

Specification of Letters Patent.

Patented Oct. 30, 1906.

Application filed March 12, 1906. Serial No. 305,459.

*To all whom it may concern:*

Be it known that I, LEANDER L. BARTLETT, a citizen of the United States, residing at Montague City, Massachusetts, have invented certain new and useful Improvements in Reel-Seats, of which the following is a clear, full, and exact description.

The object of this invention is to provide an improved, simple, cheap, and reliable reel-holding seat upon a fishpole-butt which may be positively moved to and fro upon the butt without rotation of the reel-seat.

In carrying out this invention I provide longitudinally upon the butt and projecting from its surface at least one toothed rod or strip which may act as a guide to prevent the rotation of the reel-seat and also as a means to be engaged by a threaded means carried on the reel-seat sleeve for effecting the positive to-and-fro movement of the sleeve. The sleeve is formed to embrace the butt and has suitable guiding grooves for engagement with the strips on the butt and carries a collar or ring having an internally-threaded bore rotatable upon the sleeve, which sleeve is provided with openings, preferably in line with the grooves, through which the teeth of the thread may project in order to engage with the teeth of the strip on the butt. The sleeve is preferably so formed that the ring may not be slid longitudinally thereon, while entirely free for rotation upon the sleeve.

Figure 1:
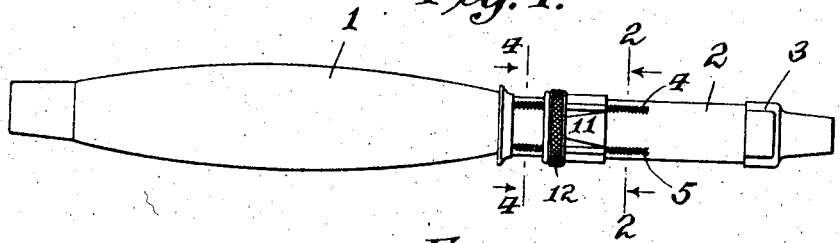
Figure 2:
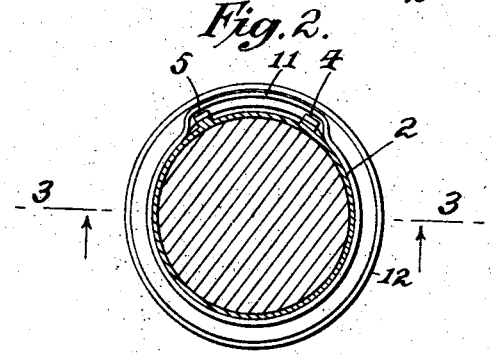
Figure 3:
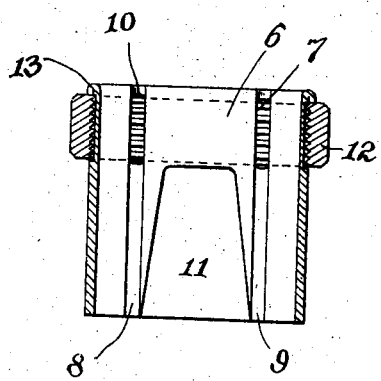
Figure 4:
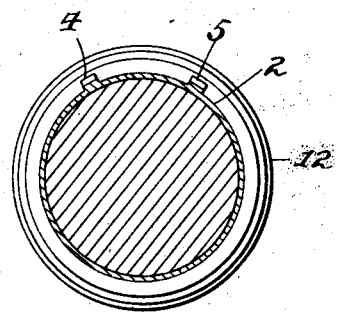

In the accompanying drawings, Figure 1 is a side elevation of a fishpole-butt provided with my invention. Fig. 2 is a section on line 2 2, Fig. 1, but drawn to an enlarged scale. Fig. 3 is a section on line 3 3, Fig. 2; and Fig. 4 is a section on line 4 4, Fig. 1, but drawn to the scale of Figs. 2 and 3.

The fishpole is provided with a handle 1, terminating in a tubular portion 2, having a stationary reel-seat 3 at its outer end. The tubular portion 2 is preferably formed of a metal cylinder carrying longitudinal toothed or segmentally-threaded strips 4 and 5, projecting from the surface. The movable reel-seat is formed as a sleeve 6, having a portion near its rear end 7 undercut and provided with preferably two grooves 8 and 9 longitudinal to the sleeve and so shaped as to nicely fit the projecting strips 4 and 5 when the sleeve is in position. These grooves are entirely cut through the metal near their rear end at 10, while at their forward end between the two grooves the metal is upset to form a recess or seat 11 for the reception of the reel end. A threaded ring 12 is placed upon the sleeve near the rear end, so that the threads will come opposite the aforesaid openings 10, after which insertion of the ring the rear end 13 of the sleeve may be turned back upon itself to form an abutment to prevent the withdrawal of the ring. If desired, the metal may be slightly undercut, as before indicated at 7, to prevent the forward movement of the ring 12 upon the sleeve and also that the threaded bore of the sleeve may project a sufficient distance through the apertures 10 of the sleeve.

It will be readily seen, particularly upon reference to Fig. 1, that the ordinary reel may have one of its supporting ends inserted in the stationary reel-seat 3, while the movable reel-seat 11 may be brought up to engage its other end by merely turning the threaded sleeve 12 circumferentially, its threaded bore engaging through apertures 10 with the teeth of the strips 4 and 5, thus advancing or retracting the movable reel-seat and sleeve as desired, while the seat and sleeve are prevented from turning rotarily because the grooves 8 and 9 are practically keyed to the butt by said strips 4 and 5.

What I claim is—

1. In combination with a fishpole-butt having a segmental threaded strip longitudinally located upon its surface, of a reel-clamp having a non-rotatable slidable sleeve, a rotatable ring with a threaded bore carried by said sleeve and adapted to engage said threaded strip.

2. In combination with a fishpole-butt having a segmental threaded strip longitudinally located upon its surface, of a reel-clamp having a guiding-groove fitting said strip and preventing its rotation on the butt, a ring rotatable on the sleeve and having an internally-threaded bore adapted to engage the strip.

3. In combination with a fishpole-butt having a segmental threaded strip longitudinally located upon its surface, of a reel-clamp having a guiding-groove fitting said strip and preventing its rotation on the butt, a ring rotatable on the sleeve and having an internally-threaded bore adapted to engage the strip, said sleeving having an enlarged abutment at one end to prevent the removal of the ring and at least a hole through the sleeve beneath the ring.

4. In combination with a fishpole-butt having a segmental threaded strip longitudinally located upon its surface, of a reel-clamp having a guiding-groove fitting said strip and preventing its rotation on the butt, a ring rotatable on the sleeve and having an internally-threaded bore adapted to engage the strip, said sleeving having an enlarged abutment at one end to prevent the removal of the ring and at least a hole through the sleeve beneath the ring, said hole being in line with said groove.

Signed at Montague City, Massachusetts, this 8th day of March, 1906.

LEANDER L. BARTLETT.

Witnesses:
CHARLES W. SCHULER,
ROBERT E. KELLS.